Nov. 20, 1951  G. B. ELLIS  2,575,337
SEALING DEVICE FOR DRY CELLS
Filed Oct. 2, 1950

INVENTOR.
GRENVILLE B. ELLIS
BY
Harry M. Saragovitz
Attorney

Patented Nov. 20, 1951

2,575,337

UNITED STATES PATENT OFFICE 2,575,337

SEALING DEVICE FOR DRY CELLS

Grenville B. Ellis, Red Bank, N. J., assignor to the United States of America as represented by the Secretary of the Army Application October 2, 1950, Serial No. 188,047

3 Claims. (Cl. 136—111)

(Granted under the act of March 3, 1883, as amended April 30, 1928; 370 O. G. 757)

The invention described herein may be manufactured and used by or for the Government for governmental purposes without the payment to me of any royalty thereon.

This invention relates to primary cells and more particularly to improved sealing means for an alkaline dry type cell.

The use of an alkaline electrolyte in any battery system where it is necessary to seal the cells to prevent leakage, always presents a problem due to the tendency of the alkaline electrolyte to creep or leak. Cells of this type have been constructed using neoprene grommets or similar type gaskets at the closure points of the cell in an attempt to produce various types of leakproof cells.

The construction contemplated by this invention would eliminate the use of grommets as is now presently required, thereby reducing the cost of construction, simplifying the procedure of manufacture and eliminating the primary source of alkaline leakage.

It is an object of this invention to provide an improved plastic housing for an hermetically sealed dry type alkaline cell.

It is another object of this invention to provide an improved cell structure which will prevent the creepage of the alkaline electrolyte, without the use of insulating grommets or gaskets.

It is a further object of this invention to provide an improved cell structure which will permit the complete manufacture of the cell without activation and provide for subsequent activation of the cell just prior to its use. Other objects will become apparent from the following description of a preferred embodiment of the invention in its application to known alkaline dry cells comprising essentially as internal elements, an anode of amalgamated zinc or its equivalent, a cathode consisting of an electronically conductive mass of oxygen yielding compounds such as mercuric-oxide, silver-oxide or the like, an ionically conductive barrier between said anode and cathode, and an immobilized body of an aqueous alkaline metal hydroxide electrolyte initially containing a substantial quantity of alkaline metal in solution.

Figure 1:
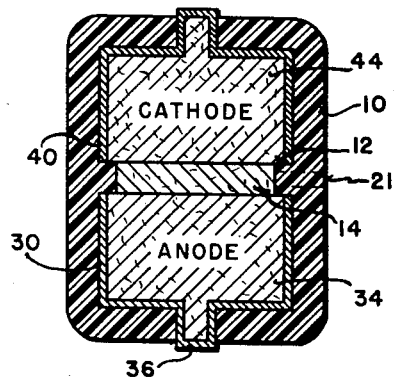
Fig. 1 is a vertical sectional view of the cell embodying one form of the present invention.
Figure 2:
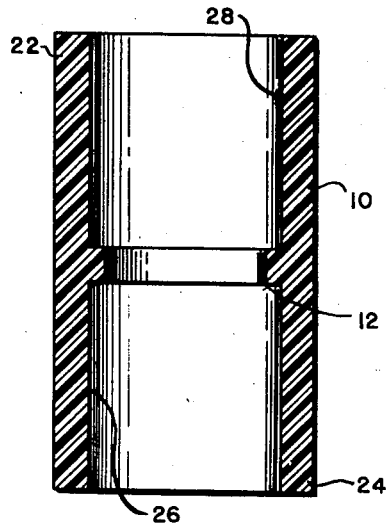
Fig. 2 is a vertical sectional view of the plastic housing.
Figure 3:
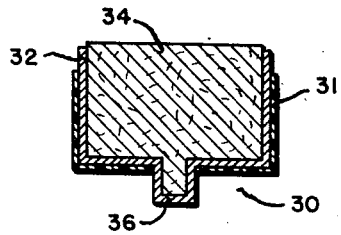
Figs. 3 and 4 are sectional views of the anode and cathode containers.
Figure 4:
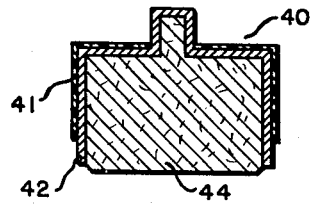

The primary cell illustrated in the drawing comprises a cylindrical or tubular housing 10 of plastic dielectric material such as polystyrene, methyl-methacrylate, ethyl cellulose, nylon or other synthetic high polymers conventionally used for such purposes. The tubular housing 10 is provided with an inwardly projecting annular flange or stud 12 positioned approximately at the midpoint between the projecting edges 22, 24 of housing 10. The tubular housing 10 is provided with projecting edges 22, 24 as shown the purposes of which will be described hereafter. The flange 12 projects inwardly from the inner wall of housing 10 sufficiently to provide a firm resting place for the open ends of anode container 30 and cathode container 40, and yet maintain sufficient spacing for the insertion of the electronically conductive barrier 14. The barrier disc 14 substantially equal in diameter to the distance between the projecting edges of flange 12, consisting, as is well known, of a material which will allow rapid ionic flow, but prevent the flow of impurities from the depolarizer to the anode, separates the cathodic material in container 40 from the anodic material in container 30. The spacing between the anode and cathode may be very small, in the order of 20 or 30 mils, if adequate barrier means are used.

Container 30 consists of an inner metal cup 32, such as steel or other similarly conductive material. The metal cup 32 has a nipple 36 to facilitate any external connections to be made to the cell. Metal cup 32 is filled with the anodic material 34 described hereinbefore. Anodic material 34 extrudes slightly, above the lip of container 30 so as to make good ionic contact with barrier 14 when inserted in housing 10. Thin plastic material 31, similar to the material used for housing 10 is firmly bonded to the side walls and the bottom of container 30, but leaves conductive area 36 exposed, to be used as a circuit terminal.

Container 40 is similar in construction to container 30 except that it is completely filled with cathodic material 44.

The primary cell as illustrated in Fig. 1 is assembled in the following manner. Container 30, having anodic material 34 already contained therein and thin plastic layer 31 firmly bonded to metal cup 32 is inserted into tubular housing 10 so that the open end of metal cup 32 firmly rests upon flange 12 and its side walls make a snug fit with the inner surfaces of side walls 26 of tubular housing 10. Projecting edges 24 of tubular housing 10 are then folded inwardly under the influence of heat and heat sealed to plastic layer 31, thus making a leak proof, air tight, non-conductive seal between housing 10 and anodic container 30. Barrier 14 is then activated with an electrolytic solution and inserted into tubular housing 10, being positioned in the space provided for it between the edges of flange 12. Container 40 having cathodic material 44 already contained therein and thin plastic layer 41 firmly bonded to metal cup 42 is then inserted into tubular housing 10 through its other open end so that the open end of container 40 firmly rests upon flange 12 and cathodic material 44 makes good ionic contact with barrier 14 and the side walls of container 40 makes a snug fit with the inner side walls 28 of tubular housing 10. Projecting edges 22 of tubular housing 10 are then folded inwardly under the influence of heat and heat sealed to plastic layer 41 thus making a leak-proof, air-tight, non-conductive seal between the housing 10 and cathodic container 40. The extruded portions of anode material 34 and cathode material 44 together with the snug fit of containers 30 and 40 in tubular housing 10 as described before, insure an intimate ionic contact between anodic material 34 and barrier 14 and cathodic material 44 and barrier 14.

Another embodiment of the invention which is particularly adapted to cells requiring a long shelf life will now be described.

A cell of Fig. 1 is assembled in a similar manner as described hereinbefore, except that barrier 14 is inserted into the housing 10 in an unactivated condition. The construction of tubular housing 10 is also modified by providing a hole or passageway 21 indicated in Fig. 1 by dotted lines. This passageway is positioned so as to be axially aligned with barrier 14 through the side walls and flange 12 of housing 10. After the complete assembly of the cell, utilizing this construction, the cell may be put away or stored for any length of time without deterioration of the internal elements. When activation of the cell is desired the electrolytic solution is inserted in to barrier 14 through passageway 21. Passageway 21 is then heat sealed.

Describing another embodiment of the invention, containers composed of conductive plastic material can be used instead of the metal containers 32 and 42 as the anodic and cathodic elements. The use of these conductive plastic containers would obviate the need for thin plastic layers 31 and 41. These modified containers themselves would present the plastic to plastic surfaces needed in heat sealing projecting edges 22, 24 to the containers. This would further simplify the manufacturing procedure involved in the assembling of the complete cell.

The particular combination of features as defined by the appended claims provides a primary alkaline dry cell which can be readily and inexpensively assembled from a single prefabricated plastic housing and also provides for the sealing of the internal elements in the container without the use of insulating grommets or gaskets.

What is claimed is:

1. A leak-proof primary alkaline dry cell comprising a tubular housing of plastic material, an inwardly projecting annular flange positioned therein, an anodic element, a cathodic element, an ionically conductive barrier disposed between said elements, said elements being contained in metal cups, said metal cups having a thin layer of said plastic material firmly bonded to their outer surfaces but having exposed circuit terminals thereon, the open ends of said metal cups being compressably maintained against said flange and said barrier so as to be in intimate ionic contact with said barrier but spaced apart by the thickness of said flange, and the open ends of said housing being thermoplastically sealed to said outer surfaces.

2. A leak-proof primary alkaline dry cell comprising a tubular housing of non-conductive plastic material, said housing being divided by an inwardly projecting annular flange into an upper and lower compartment, an anodic element, a cathodic element, a conductive cup for containing each of said elements, each of said cups being disposed within each of said compartments, the open ends of each of said cups being compressably maintained against the lips of said flange, an ionically conductive barrier in intimate contact with said open ends, circuit terminals positioned at the closed ends of each of said cups, said cups having a thin layer of said plastic material firmly bonded to the walls thereof and means for thermoplastically sealing said cups to the open ends of said tubular housing, but leaving said circuit terminals exposed.

3. In a leak proof primary alkaline dry cell as described in claim 2 wherein said barrier is in a chemically inert condition, means for providing access to said barrier for chemically activating said cell and means for thermoplastically sealing said access means.

GRENVILLE B. ELLIS.

REFERENCES CITED

The following references are of record in the file of this patent:

UNITED STATES PATENTS

| Number | Name | Date |
| --- | --- | --- |
| 2,050,174 | Gordon | Aug. 4, 1936 |
| 2,480,839 | Daniel | Sept. 6, 1949 |
| 2,483,983 | Quinnell | Oct. 4, 1949 |
| 2,536,698 | Ruben | Jan. 2, 1951 |